US006184529B1

(12) United States Patent
Contini

(10) Patent No.: US 6,184,529 B1
(45) Date of Patent: *Feb. 6, 2001

(54) METHODS AND APPARATUS FOR PERFORMING SCENE BASED UNIFORMITY CORRECTION IN IMAGING SYSTEMS

(75) Inventor: Casey L. Contini, Clermont, FL (US)

(73) Assignee: Lockheed Martin Corporation, Bethesda, MD (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/014,910

(22) Filed: Jan. 28, 1998

(51) Int. Cl.⁷ .................................. G02B 1/08; G01J 5/00
(52) U.S. Cl. ................. 250/347; 250/252; 250/252.1; 250/341.5; 250/351; 250/342; 359/350; 359/355; 359/356; 359/359
(58) Field of Search .................. 250/252.1, 339.02, 250/339.09, 339.14, 341.5, 342, 347, 350, 351, 332; 359/350, 353, 355, 356, 359

(56) References Cited

U.S. PATENT DOCUMENTS

| 4,832,451 | 5/1989 | Trescott . |
| 4,876,453 | 10/1989 | Wirick . |
| 4,948,964 | 8/1990 | Gohlke . |
| 4,999,005 | 3/1991 | Cooper . |
| 5,051,591 | 9/1991 | Trotta et al. . |
| 5,323,002 | 6/1994 | Sampsell et al. . |
| 5,420,421 | 5/1995 | Lindgren et al. . |
| 5,673,143 | * 9/1997 | Chin et al. .................. 359/354 |
| 5,811,808 | * 9/1998 | Cannata et al. .............. 250/332 |
| 5,867,307 | * 2/1999 | Myers et al. ................. 359/350 |

* cited by examiner

*Primary Examiner*—Constantine Hannaher
*Assistant Examiner*—Albert Gagliardi
(74) *Attorney, Agent, or Firm*—Burns, Doane, Swecker & Mathis, LLP

(57) ABSTRACT

Methods and apparatus for generating uniform reference sources for use in calibrating multiple-detector imaging devices. In exemplary embodiments, a plano-plano reference lens is inserted at a non-focusing position in the optics path of a multiple-detector imaging device. The reference lens includes a highly polished side coated with a semi-reflective film and a rough polished side coated with an anti-reflective coating. The smooth polished side causes the detector array to see a reflected image of itself and a portion of the incoming scene energy simultaneously. The energy emitted by the detector array thus mixes with the scene energy to create a detected photon flux level which is dependent upon, but deviates in a controlled manner from, that of the scene energy alone. At the same time, the rough polished side and the thickness of the reference lens blur the detected image to eliminate scene structure and to provide a uniform photon flux level at each detector in the array. Since the detected flux is uniform and dependent upon the scene energy, the inserted reference lens effectively provides a reference source suitable for detector calibration. Additional reference lenses of varying reflectivity can be successively inserted to provide additional calibration points. Advantageously, the reference source levels vary automatically and passively with the viewed scene flux, and the present invention eliminates many of the drawbacks associated with conventional calibration techniques.

65 Claims, 8 Drawing Sheets

METHODS AND APPARATUS FOR PERFORMING SCENE BASED UNIFORMITY CORRECTION IN IMAGING SYSTEMS

BACKGROUND OF THE INVENTION

The present invention relates to imaging systems, and more particularly to the correction of non-uniformities among detectors in multiple-detector imaging systems.

Today, optical imaging systems are in widespread use. For example, thermal imaging devices are used in diverse applications ranging from military missile-seeking systems to early fire detection and warning systems. Recent advances in imaging system technology, particularly the trend toward multiple-detector imaging systems in which an array of radiation detectors are used to capture scene images, have led to a need for more advanced detector calibration techniques. Specifically, each detector in a multiple-detector system typically must be calibrated so that the entire detector array provides a uniform output level when irradiated by a uniform input source.

As a result, numerous techniques have been developed for creating uniform reference sources which can be used to irradiate an array of detectors and to thereby determine individual detector variations across the array. Such variations are generally characterized by level and gain differences between individual detectors and are correctable once known. For example, if the output level provided by each of a plurality of detectors in response to a fixed uniform reference source is known, then an appropriate detector-specific offset value can be removed from each detector output during operation so that the entire detector array is calibrated at least at the reference level. This type of single-point calibration is depicted in FIG. 1.

In FIG. 1, output-voltage versus input-radiation-flux characteristics for three photovoltaic-type detectors are shown as three curved lines 110, 120, 130 which intersect at a single point corresponding to an input-flux reference level $IF_R$ and an output-voltage reference level $V_R$. The curves 110, 120, 130 shown in FIG. 1 result, for example, when the three photovoltaic detectors are calibrated by: irradiating the detectors with a uniform reference flux of value $IF_R$; measuring the output level for each detector in response to the uniform input flux $IF_R$; computing an offset value for each detector as the difference between the measured output value and the reference output value $V_R$; and thereafter removing the computed offset values from the respective detector outputs. The reference output $V_R$ to which the detectors are calibrated can be computed, for example, as the mean, median or mode value output by the detectors in response to the uniform reference flux $IF_R$. As shown in FIG. 1, single-point calibration forces the detector outputs to be uniform at $V_R$ for the single reference input flux $IF_R$, but does not necessarily provide uniformity of output for other input flux levels.

Improved output uniformity can be achieved using two-point calibration as shown in FIG. 2, wherein output-voltage versus input-flux characteristics for three photovoltaic detectors are shown as three curved lines 210, 220, 230 intersecting at two points. The first point of intersection corresponds to a first input-flux reference level $IF_{R1}$ and a first output-voltage reference level $V_{R1}$, and the second point of intersection corresponds to a second input-flux reference level $IF_{R2}$ and a second output-voltage reference level $V_{R2}$. The curves 210, 220, 230 shown in FIG. 2 result, for example, when the three photovoitaic detectors are calibrated by: irradiating the detectors with a first uniform reference flux of value $IF_{R1}$ and measuring the resulting output level for each detector; subsequently irradiating the detectors with a second uniform reference flux of value $IF_{R2}$ and measuring the resulting output level for each detector; computing the first and second output reference values $V_{R1}$, $V_{R2}$ for example as the mean, median or mode values output by the detectors in response to the first and second uniform reference fluxes $I_{R1}$, $I_{R2}$, respectively; and using the reference values $V_{R1}$, $V_{R2}$ and the measured detector outputs to compute a scale factor and an offset value for each detector which will force the detector outputs to the first and second reference values $V_{R1}$, $V_{R2}$ for input fluxes corresponding to the first and second reference fluxes $I_{R1}$, $I_{R2}$, respectively.

Since typical detector output characteristics are nearly linear over a given operating range, two-point calibration can be used to obtain very closely matched curves throughout that operating range. In other words, if multiple detectors are precisely calibrated at two reference levels within a region in which the detectors operate in an approximately linear fashion, then the detectors will also be very nearly calibrated throughout the linear region. In FIG. 2, the three operating curves 210, 220, 230 are precisely matched at the first and second reference levels $I_{R1}$, $I_{R2}$ and are very nearly matched in a linear operating region lying between the two reference levels. For best accuracy, the reference levels are positioned near the extremes of the linear operating region. Note that, although it is not generally efficient to calibrate a detector array using more than two reference points, multiple reference levels can be used to make extremely precise piece-wise linear corrections.

Thus, if an array of detectors can be irradiated with one or more uniform reference sources, then the array can be calibrated in a relatively straightforward fashion. However, providing such uniform reference sources has proven difficult. For example, one cannot simply position a reference source in the ordinary field of view of an imaging device, as doing so results in unacceptably high uniformity requirements for the reference source itself. In other words, if the reference source is positioned in a viewed scene such that it is focused on the detector array, then the reference source must be truly uniform in order to provide uniform radiation at the detector array. It is therefore typically preferred that the reference source be positioned at a non-imaging location in the optical path of the imaging device so that the reference source is not focused on the detector array. Doing so creates a natural defocusing and averaging effect which results in a uniform photon flux across the detector array without requiring that the reference source itself be precisely uniform. However, selectively positioning a reference source within a tightly confined and difficult to access optical path also presents challenges.

Furthermore, controlling the magnitude of a reference photon flux has proven to be far from trivial. This results from the fact that it is typically preferable that reference fluxes be continually adjusted in dependence upon the level of energy emanating from an ever changing viewed scene. For example, empirical studies have demonstrated that best corrections can be achieved if the two reference sources in a two-point calibration are dynamically adjusted to bound the instantaneous average scene photon flux. Alternatively, one reference source can be positioned at the instantaneous average scene flux while the other reference source is positioned somewhere above or below the instantaneous average flux. In either event, both reference points should be continually positioned within the instantaneous dynamic flux range of the detectors. The dynamic nature of the calibration problem is depicted in FIG. 3, wherein the three input-output curves 210, 220, 230 of FIG. 2 are again calibrated at the two input flux reference levels $IF_{R1}$, $IF_{R2}$ so that the curves are very closely matched in the region between the reference levels and not necessarily well matched in the regions 320 lying outside the reference levels. In FIG. 3, however, the two input flux levels $IF_{R1}$, $IF_{R2}$ are positioned near opposite ends of an instantaneous detector dynamic flux range 310 which, as indicated by a two-headed arrow 315, changes with time in dependence upon the viewed scene energy. As a result, the two input flux reference levels $IF_{R1}$, $IF_{R2}$ should be continually adjusted in time as well.

While many techniques have been developed for providing reference sources in the above described context, each known method includes significant disadvantages. For example, certain conventional systems employ controlled heating and cooling to force the photon flux at a detector array to be uniform and near the average scene flux. However, the control circuitry and power required to provide such heating and cooling is prohibitively costly and makes insertion of a reference source into the detector optical path extremely complex and expensive. Other conventional systems employ fixed thermal reference sources which are less costly and more easily inserted into the detector optical path. However, because such fixed reference sources must span the entire range of possible scene flux levels, these systems utilize a relatively large detector dynamic flux input range. As a result, the thermal sensitivity of the detector arrays employed in such systems is significantly degraded.

Thus, known techniques are unsatisfactory in many respects and there is a need for improved methods and apparatus for providing uniform radiation reference sources in multiple-detector imaging systems.

SUMMARY OF THE INVENTION

The present invention fulfills the above-described and other needs by providing methods and apparatus for generating reference radiation sources with uniform photon flux levels that are proportional to a viewed scene. In exemplary embodiments, a plano-plano reference lens having a rough surface finish on one side and a polished surface finish on an opposite side is inserted into the focusing optics path of an imaging device. The imaging device includes an array of radiation detectors positioned at a focal plane in the optics path, and the reference lens is inserted into either a converging or diverging region of the optics path. According to the exemplary embodiments, the polished surface of the reference lens is coated with a semi-reflective film so that the detector array sees a reflected image of itself and a portion of the incoming scene energy simultaneously. The energy emitted by the detector array thus mixes with the scene energy to create a detected photon flux level which is dependent upon, but deviates from, that of the scene energy alone. The magnitude of the deviation is controlled via the reflectivity of the film coating on the smooth surface of the reference lens. At the same time, the rough surface and the thickness of the reference lens blur the detected image to eliminate scene structure and to provide a uniform photon flux level at each detector in the array. Since the detected flux is uniform and dependent upon the scene energy, the inserted reference lens effectively provides a reference source suitable for detector calibration. Furthermore, multiple reference lenses, each providing a different level of reflectivity, can be successively inserted into the optics path to provide additional calibration points as necessary.

Advantageously, the present invention provides reference source levels that vary with scene flux automatically and passively. Thus, the present invention virtually eliminates the drawbacks associated with conventional techniques. For example, because the reference source of the present invention is passive and requires no heating, cooling or electrical wiring, it is less complex, less expensive, and more easily inserted into an optics path as compared to conventional reference sources. Additionally, since the reference source of the present invention automatically varies with scene flux, a large dynamic flux input range is not required and superior detector thermal sensitivity can be achieved.

In an exemplary embodiment, an imaging device according to the invention includes optics configured to collect and focus scene radiation onto a focal plane in the optical path of the imaging device, a plurality of radiation detectors positioned in the focal plane, a plano-plano reference lens having a first side which is rough polished and coated with a non-reflective material and a second side which is smooth polished and coated with a partially reflective material, and a lens carrier supporting the reference lens and configured to selectively position the reference lens within and without the optical path. According to the exemplary embodiment, the reference lens is configured to provide the plurality of radiation detectors with a uniform level of radiation when the reference lens is positioned within the optical path, the uniform level of radiation having a value which lies within an instantaneous dynamic flux range of the plurality of radiation detectors.

In an alternative embodiment, the present invention teaches an exemplary method for correcting non-uniformities among radiation detectors which are positioned in a focal plane of the optical path of an imaging device. The exemplary method includes the steps of positioning a plano-plano reference lens within the optical path to provide the radiation detectors with a uniform level of radiation, computing an offset value for each of the radiation detectors based on values output by the radiation detectors when the reference lens is positioned within the optical path, removing the reference lens from the optical path, and computing a corrected output value for each of the radiation detectors based on the computed offset values and on values output by the radiation detectors when the reference lens is removed from the optical path.

The above described and additional features of the present invention are explained in greater detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

Figure 4:
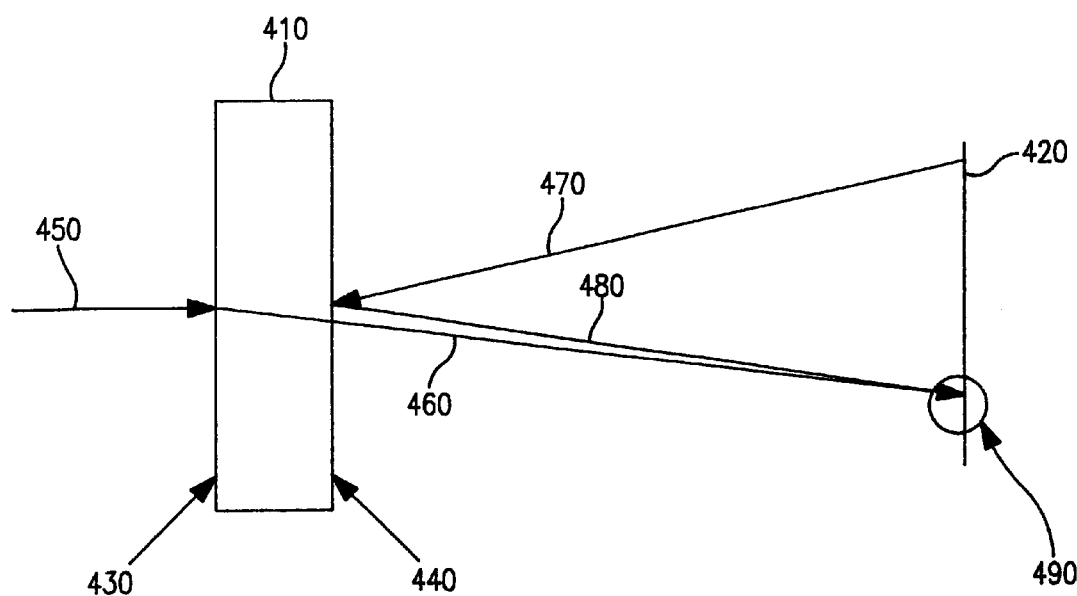
FIG. 4 depicts an exemplary imaging system constructed in accordance with the teachings of the present invention.

FIG. 4 provides a side view of an exemplary imaging device 400 constructed in accordance with the present invention. As shown, the imaging device 400 includes a plano-plano reference lens 410 and a planar array of radiation detectors 420. Those skilled in the art will appreciate that, although they are not explicitly shown in FIG. 4, appropriate optics are also included in the imaging device 400 for collecting and focusing incoming radiation onto a focal plane in which the detector array 420 is situated. The optics and the focal plane detector array 420 form an optical path for the imaging device 400. The detector array 420 can be either a two-dimensional staring-type focal plane array or a linear scanning-type focal plane array as is well known in the art. Additionally, the detector array can be made sensitive to a particular radiation waveband as is also well known in the art. For example, the imaging device 400 can be used as an infrared detection device. Furthermore, the detector array can include any suitable type of known radiation transducers, including cryogenically cooled photovoltaic devices or photoconductors and uncooled thermal detectors. Thus, although the exemplary embodiments are sometimes described hereinafter with reference to cryogenically cooled infrared focal plane arrays, those skilled in the art will appreciate that the teachings of the present invention are readily applicable in any type of imaging device which includes multiple radiation detectors.

In the embodiment of FIG. 4, the plano-plano reference lens 410 is constructed with specific surface quality finishes and radiation transmission and reflection properties. More specifically, the reference lens 410 is made of a material which is transparent in the waveband (e.g., infrared) being used for imaging by the focal plane detector array 410. Additionally, the reference lens 410 is made large enough in diameter so that it does not vignette light rays from a viewed scene to the focal plane detector array. A first side 430 of the reference lens 410 is rough polished (e.g., using a 35 micron) approximately 0.035 mm, or higher grit abrasive material), and a second side 440 of the reference lens is smooth polished to an ophthalmic finish (e.g., to a greater than 200 polished finish). An anti-reflection coating which spans the waveband being imaged by the detector array 420 is deposited on the rough polished side 430, and a partially reflective and partially transmissive thin film coating is deposited on the smooth polished side 440.

When the reference lens 410 is positioned within the optical path as shown in FIG. 4, it provides a uniform photon flux level at the detector array 420 which is dependent upon the energy received from the viewed scene and therefore ideal for use in calibrating the detector array 420. More specifically, the reference lens 410 is positioned at a point in the optical path where incoming rays are converging or diverging. The rough polished lens surface 430 diffuses the incoming light rays and blurs the scene image perceived at the detector array 420. The diffusion and blurring effect is enhanced by the index of refraction and the thickness of the reference lens as described in detail below with respect to FIG. 5. Thus, the position of the reference lens 410, the rough polished lens surface 430 and the reference lens 410 itself combine to provide a uniform photon flux at the detector array 420. At the same time, the reflective properties of the smooth polished side 440 mix energy emanating from the detector array 420 with energy received from the viewed scene to provide a detected photon flux level which is dependent upon, but deviates from, that of the viewed scene alone. The amount of deviation is determined by the reflectivity of the thin film coating on the smooth polished lens surface 440. Thus, the reference lens 410 effectively provides a reference source which is easily inserted within the optical path and which passively and automatically varies with the scene energy as desired.

Operation of the imaging device 400 and the reference lens 410 in particular are illustrated by vector representation of radiation patterns in FIG. 4. As shown, incoming scene radiation (vector 450) impinges upon and is diffused by the rough polished lens surface 430. The diffused radiation (vector 460) passes through the reference lens 410 and impinges upon the detector array 420. At the same time, radiation emanating from the detector array 420 (vector 470) impinges upon the smooth polished lens surface 440 and is partially reflected back toward the detector array 420 (vector 480). The diffused scene radiation (vector 460) and the reflected detector radiation (vector 480) mix at the detector array 420 (e.g., at region 490) and provide a uniform reference photon flux at the detector array 420 which is dependent upon the scene energy. The ratio of reflective to transmissive properties of the thin film coating on the smooth polished surface 440 establishes the photon flux level of the uniform reference. For example, in an infrared application employing cryogenically cooled photovoltaic detectors (i.e., scene temperatures typically greater than 200 degrees Kelvin and detector array temperatures on the order of 77 degrees Kelvin), a low reflection-to-transmission ratio results in a reference flux nearly equal the scene flux, while a ratio of 0.5 results in a reference flux which is roughly half the scene flux. As described above, such references can be used effectively to perform dynamic single-point or multi-point detector calibration. In other words, the reflection-to-transmission ratio of the thin film coating can be set based on expected scene energies and known detector temperatures to obtain uniform references which lie at appropriate points within the detector instantaneous dynamic flux range.

Figure 5:
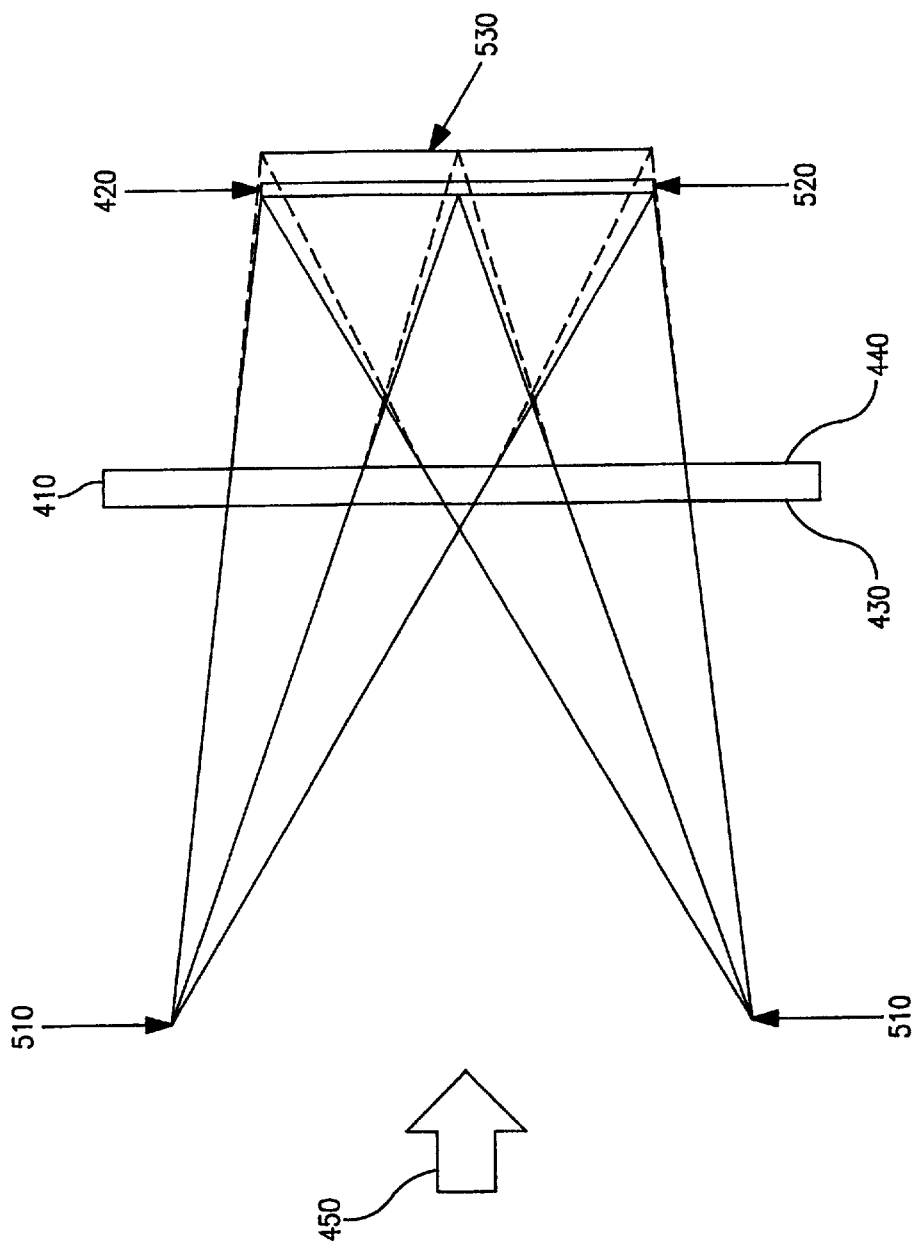
FIG. 5 depicts a shifted focal plane in an exemplary imaging system according to the present invention.

As noted above, the index of refraction and the thickness of the reference lens 410 combine with the rough polished lens surface 430 to blur the image perceived at the detector array 420. More specifically, the index of refraction and thickness of the reference lens 410 lengthen the optical path and push the effective focal plane behind the detector array 420 as shown in FIG. 5. In the figure, incoming scene radiation (vector 450) passes through imaging device optics 510 (i.e., an aperture, field stop, focal lens, etc.) and is focused onto a focal plane. When the reference lens 410 is not positioned within the optical path, the scene radiation is focused, as shown by solid lines in FIG. 5, onto an intended focal plane 520 in which the detector array 420 is situated for ordinary scene viewing. However, when the reference lens 410 is positioned within the optical path, the scene radiation is directed, as shown by dashed lines in FIG. 5, to an effective focal plane 530 which is positioned behind the detector array 420. This shifting effect, in combination with the rough polished lens surface 430, results in a blurred image and a uniform flux level at the detector array 420 as desired. In infrared implementations, the lens is typically made at least 0.03 (approximately 0.762 mm) inches thick in order to obtain sufficient diffusion and image blurring.

Figure 6:
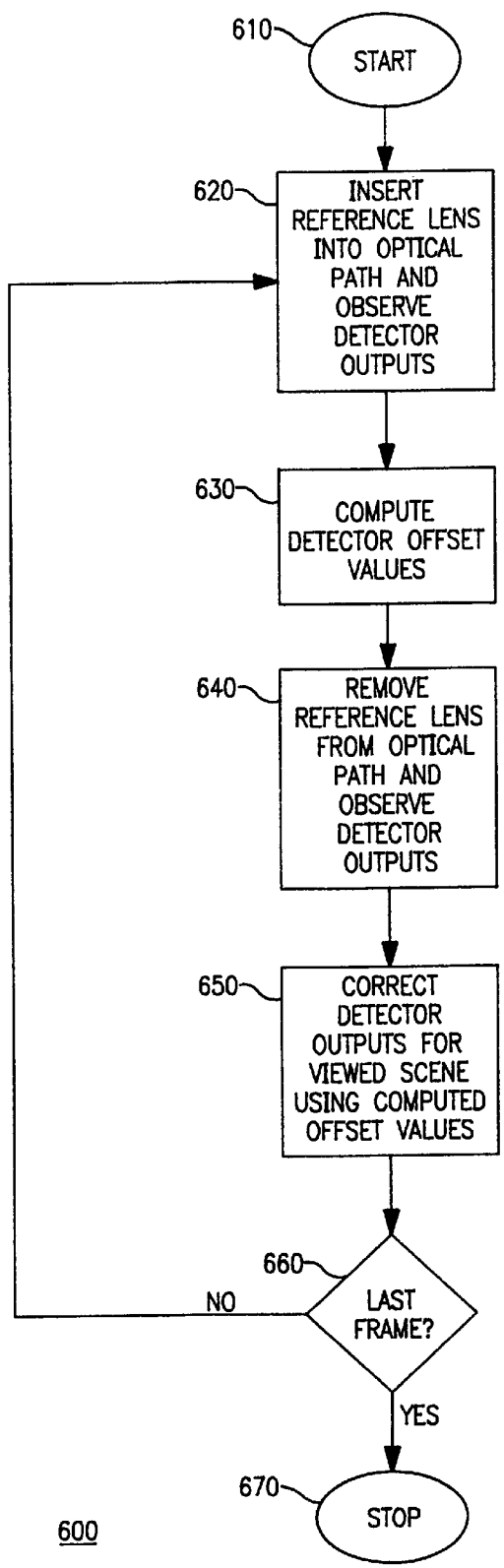
FIG. 6 depicts steps in an exemplary single-point detector calibration method according to the present invention.
Figure 7:
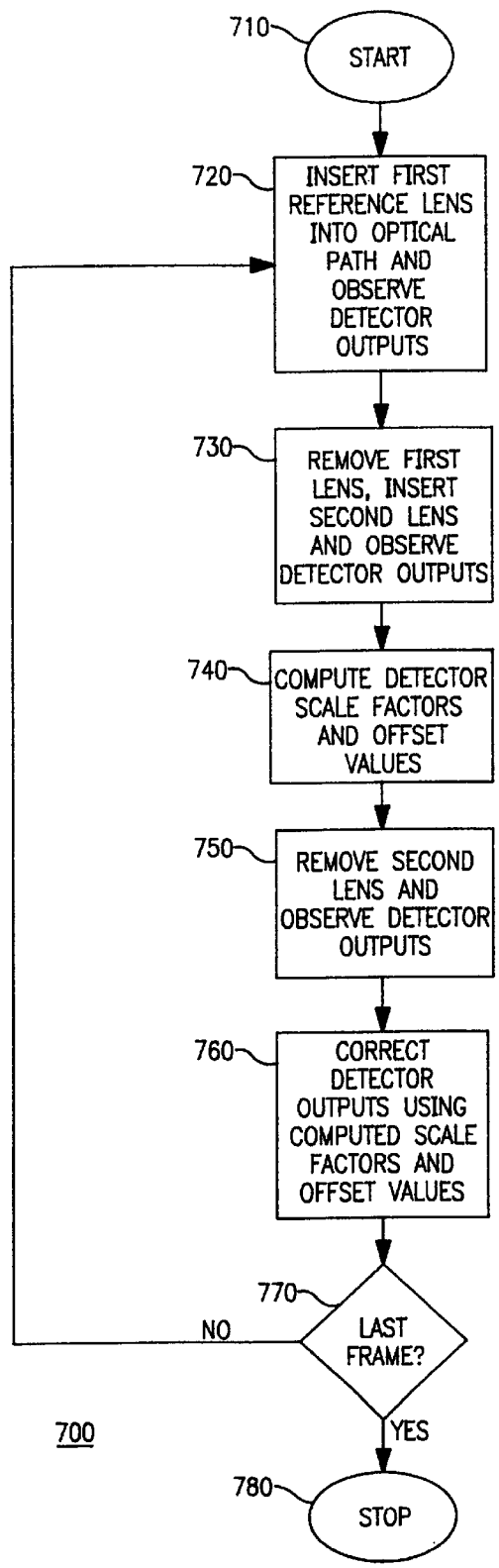
FIG. 7 depicts steps in an exemplary two-point detector calibration method according to the present invention.

FIGS. 6 and 7 depict detector calibration methods in which the exemplary system of FIGS. 4 and 5 can be utilized. Specifically, FIG. 6 depicts steps in an exemplary single-point calibration method 600, and FIG. 7 depicts steps in an exemplary two-point calibration method 700. Both methods 600, 700 can be carried out continuously and in real time during operation of the imaging device 400 so that the detector array 420 is dynamically calibrated as the viewed scene changes.

In FIG. 6, operation of the imaging device begins at step 610. At step 620, a reference lens having a predetermined reflection-transmission ratio is inserted into the optical path to provide the detector array with a scene-dependent uniform reference flux, and the outputs of the individual detectors in response to the reference flux are observed. An offset value for each of the detectors is then computed at step 630, for example as described above with respect to FIG. 1. At step 640, the reference lens is removed from the optical path so that the viewed scene is focused onto the detector array, and the detector outputs in response to the viewed scene are obtained. The detector output values for the viewed scene are then corrected at step 650 using the detector offset values computed at step 630. At step 660, a determination is made as to whether the last frame of data for the viewed scene has been obtained. If so, then processing terminates at step 670. Otherwise, processing continues at step 620, and the reference lens is re-inserted into the optical path to calibrate the detector array for the next frame of scene data. In this way, the detector array is continuously calibrated to the viewed scene in real time.

Figure 1:
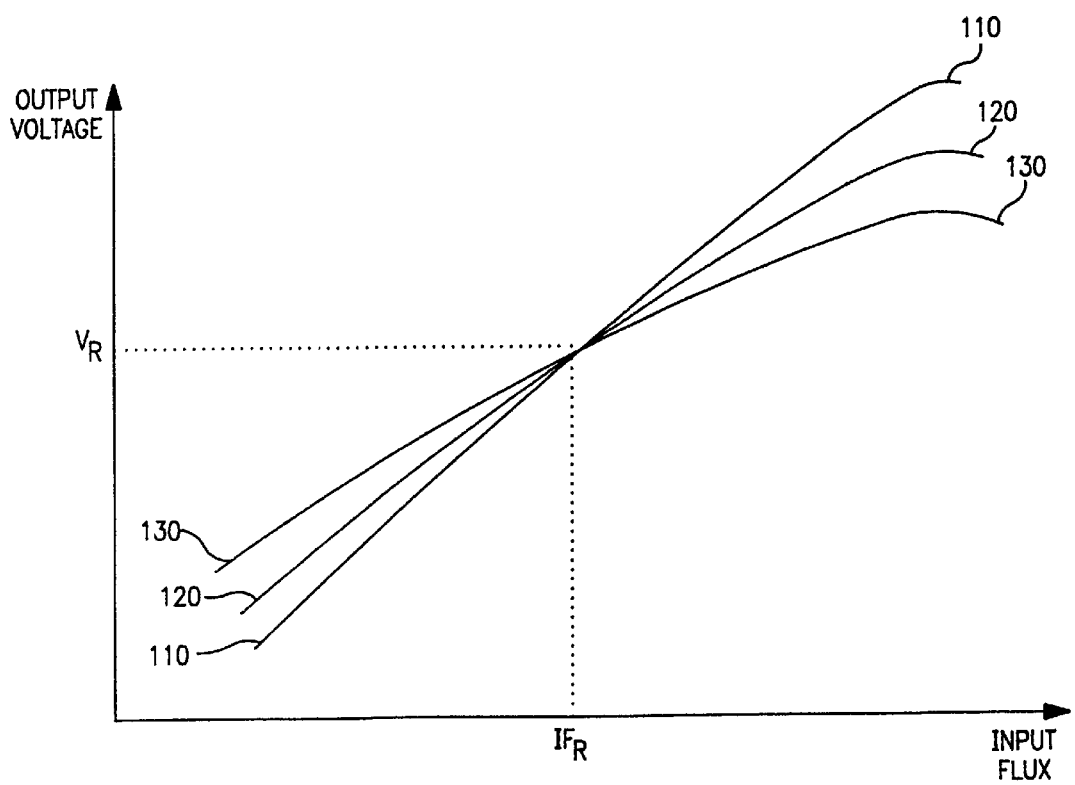
FIG. 1 depicts an exemplary single-point detector calibration technique which can be implemented using the teachings of the present invention.
Figure 2:
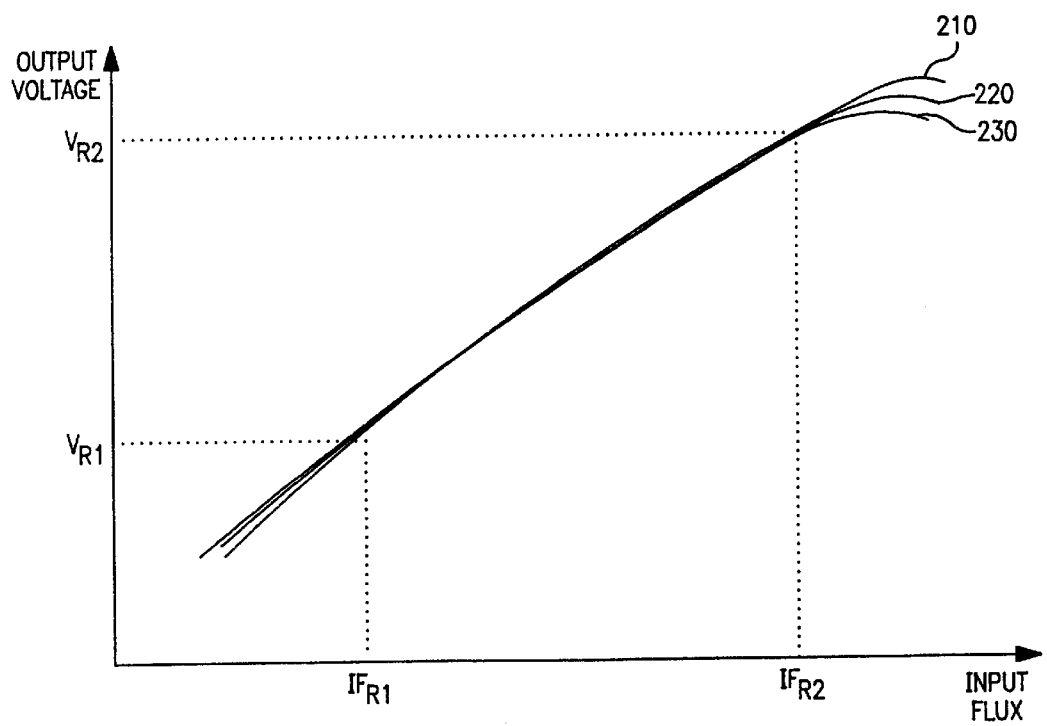
FIG. 2 depicts an exemplary two-point detector calibration technique which can be implemented using the teachings of the present invention.
Figure 3:
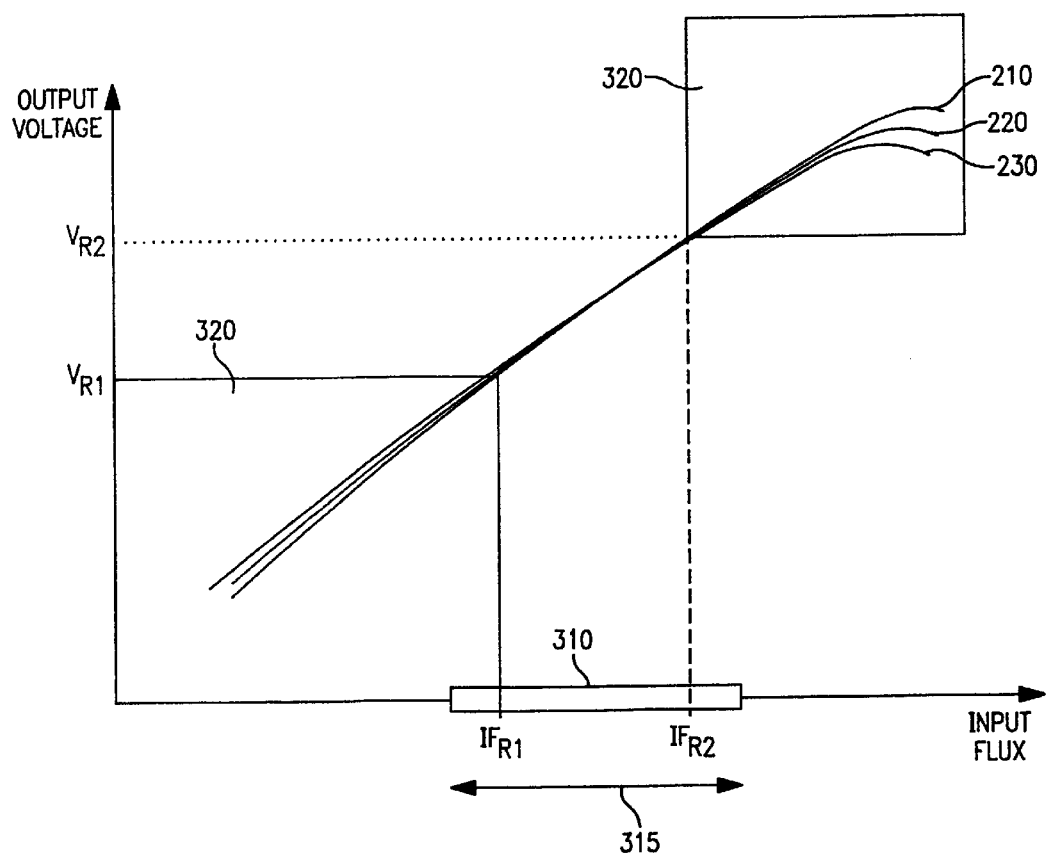
FIG. 3 depicts a dynamic two-point detector calibration technique which can be implemented using the teachings of the present invention.

As described with respect to FIG. 1, however, single-point calibration may be insufficient in certain applications, and dual-point or multi-point calibration may be preferred. In the exemplary dual-point calibration method of FIG. 7, operation of the imaging device begins at step 710. At step 720, a first reference lens having a first predetermined reflection-transmission ratio is inserted into the optical path to provide the detector array with a first scene-dependent uniform reference flux, and the outputs of the individual detectors in response to the first reference flux are observed. At step 730, the first reference lens is removed from the optical path, a second reference lens having a second predetermined reflection-transmission ratio is inserted into the optical path to provide the detector array with a second scene-dependent uniform reference flux, and the outputs of the individual detectors in response to the second reference flux are observed. A scale factor and an offset value for each of the detectors is then computed at step 740, for example as described above with respect to FIG. 2. At step 750, the second reference lens is removed from the optical path so that the viewed scene is focused onto the detector array, and the detector outputs in response to the viewed scene are obtained. The detector output values for the viewed scene are then corrected at step 760 using the detector scale factors and offset values computed at step 740. At step 770, a determination is made as to whether the last frame of data for the viewed scene has been obtained. If so, then processing terminates at step 780. Otherwise, processing continues at step 720, where the first reference lens is re-inserted into the optical path to start the calibration procedure for the next frame of scene data. As in the method of FIG. 6, the detector array is continuously calibrated to the viewed scene in real time. Those skilled in the art will appreciate that the method of FIG. 7 can be expanded to include additional uniform reference sources, for example to provide precise piece-wise linear calibration.

Figure 8:
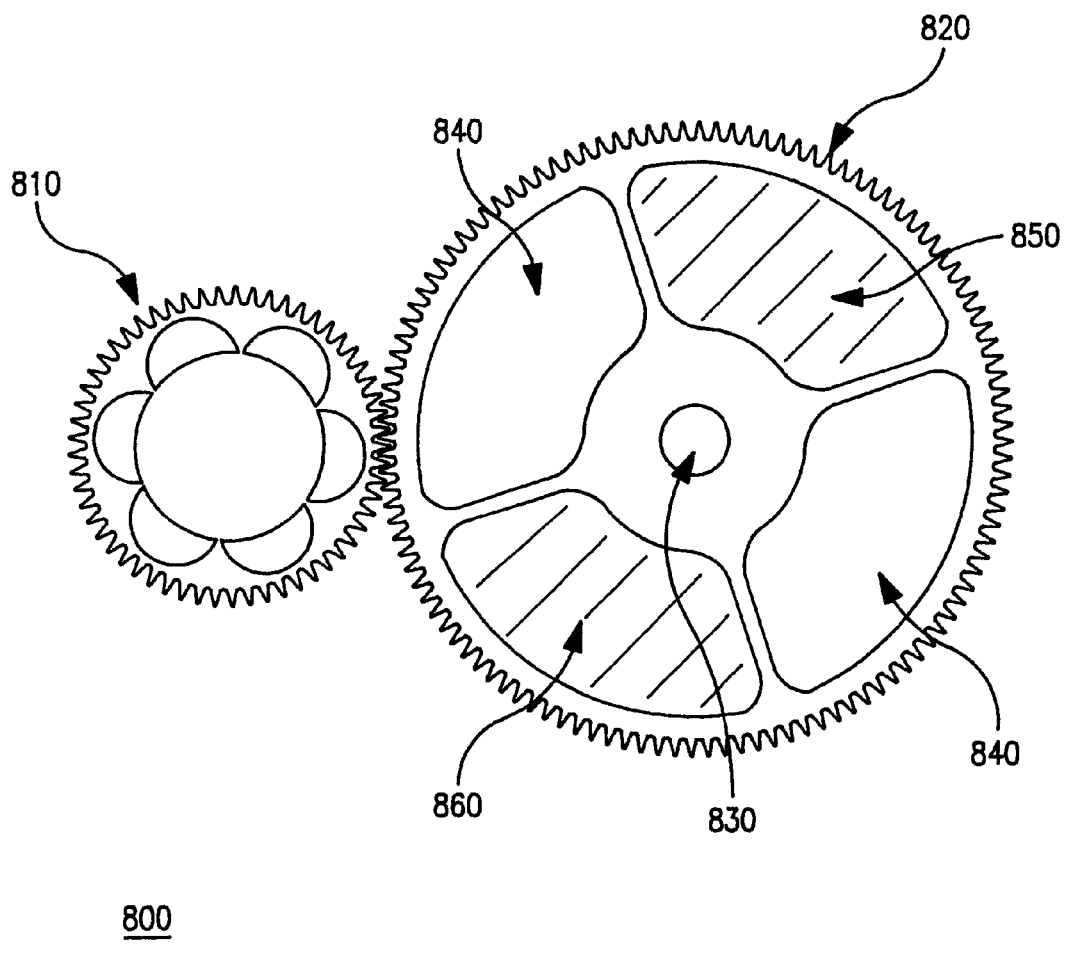
FIG. 8 depicts an exemplary lens carrier according to the present invention.

Note that the exemplary apparatus and methods of FIGS. 4–7 presume that an imaging device can include structure for selectively positioning one or more reference lenses within the optical path of the imaging device. Accordingly, FIG. 8 depicts an exemplary lens positioning system 800 which can be used to perform two-point calibration according to the invention. Those skilled in the art will appreciate that the system of FIG. 8 is but one example of an unlimited number of configurations which can be used to alternately position a plano-plano lens within and without an optical path. As shown, the lens positioning system 800 includes a synchronized motor 810 and a reference lens carrier 820. The reference lens carrier 820 is constructed as a toothed wheel, and the synchronized motor 810 includes a toothed gear head so that the motor 810 can be used to spin the reference lens carrier 820 about a rotation hub 830 in a precisely controlled fashion. As shown, the reference lens carrier 820 includes four apertures, two of which are left open (840) and two of which are used to hold first and second reference lenses 850, 860. The reference lens carrier 820 is located within an imaging device such that the apertures are successively positioned within and without the optical path of the imaging device as the lens carrier rotates (i.e., the optical path is perpendicular to the plane of FIG. 8 and offset an appropriate distance from the rotation hub 830).

In operation, the synchronous motor 810 spins the lens carrier 820 at one fourth the frame rate of the detector array, where the frame rate is defined as the number of electronic images per second generated by the array. For example, in certain 3.5 to 5.5 micrometer waveband infrared seeker applications, the frame rate of a two-dimensional staring-type focal plane array is 120, and the rotational speed of the lens carrier 820 is set at 30 Hz. Thus, every other frame output by the detector array is scene imagery, and each reference lens 850, 860 is imaged every fourth frame. The reflectivities of the first and second reference lenses 850, 860 are set as described above to provide appropriate uniform reference levels. For example, the first reference lens 850 can be highly transmissive to provide a first reference level which is similar to the average scene flux, and the second reference lens 860 can be equally reflective and transmissive to provide a second reference flux at approximately one half of the average scene flux. The two reference levels are then used as calibration points for digital linear correction of each detector output as described above with respect to FIGS. 2 and 7. During a single rotation of the lens carrier 820, two frames of scene imagery are obtained using scale factors and offsets computed during the previous rotation, and two new calibration points are obtained and new scale factors and offsets are computed for use in the ensuing rotation. Thus, scene-based calibration is performed continuously and in real time as desired.

In summary, the present invention teaches novel methods and apparatus for generating uniform reference sources for multiple-detector imaging devices. Advantageously, the disclosed reference levels vary with scene flux automatically and passively. Because the reference sources require no heating, cooling or electrical wiring, they are less complex, less expensive, and more easily inserted into an optical path as compared to conventional reference sources. Furthermore, because the references automatically vary with scene flux, large dynamic flux input ranges are not required and superior detector thermal sensitivities can be achieved.

Those skilled in the art will appreciate that the present invention is not limited to the specific exemplary embodiments which have been described herein for purposes of illustration. The scope of the invention, therefore, is defined by the claims which are appended hereto, rather than the foregoing description, and all equivalents which are consistent with the meaning of the claims are intended to be embraced therein.

I claim:

1. An imaging device, comprising:
   a plurality of radiation detectors positioned in an optical path of said imaging device;
   a plano-plano reference lens; and
   a lens carrier supporting said reference lens and configured to selectively position said reference lens within and without the optical path.

2. An imaging device according to claim 1, wherein said radiation detectors are cryogenically cooled photoconductors.

3. An imaging device according to claim 1, wherein said radiation detectors are cryogenically cooled photovoltaic devices.

4. An imaging device according to claim 1, further comprising optics configured to focus scene radiation received at said imaging device at a focal plane in the optical path.

5. An imaging device according to claim 4, wherein said plurality of radiation detectors are positioned at the focal plane and form a staring-type two-dimensional focal plane array.

6. An imaging device according to claim 4, wherein said plurality of radiation detectors are positioned in the focal plane and form a scanning-type linear focal plane array.

7. An imaging device according to claim 4, wherein said lens carrier is configured to selectively position said reference lens within the optical path and between said optics and the focal plane.

8. An imaging device according to claim 1, wherein a material used to construct said reference lens is transparent to radiation in a waveband used by said plurality of radiation detectors for imaging.

9. An imaging device according to claim 1, wherein a first side of said reference lens is rough polished and a second side of said reference lens is smooth polished.

10. An imaging device according to claim 9, wherein the first rough polished side and the second smooth polished side of said reference lens are positioned, respectively, away from and toward said plurality of radiation detectors when said reference lens is positioned within the optical path.

11. An imaging device according to claim 9, wherein the first rough polished side of said reference lens is coated with a non-reflective material and wherein the second smooth polished side of said reference lens is coated with a partially reflective material.

12. An imaging device according to claim 11, wherein the partially reflective material coating the second smooth polished side of said reference lens reduces a level of scene radiation received by said plurality of radiation detectors when said reference lens is positioned within the optical path.

13. An imaging device according to claim 11, wherein the partially reflective material coating the second smooth polished side of said reference lens reflects radiation emitted by said plurality of radiation detectors back toward said plurality of radiation detectors when said reference lens is positioned within the optical path.

14. An imaging device according to claim 11, wherein said reference lens provides said plurality of radiation detectors with a uniform level of radiation when said reference lens is positioned within the optical path, a value of the uniform level of radiation being within an instantaneous dynamic flux range of said plurality of radiation detectors.

15. An imaging device according to claim 14, wherein the value of the uniform level of radiation provided by said reference lens is approximately equal to a value corresponding to a center of the instantaneous dynamic flux range of said plurality of radiation detectors.

16. An imaging device according to claim 14, further comprising a processor configured to compute an offset value for each of said plurality of radiation detectors, wherein the offset value for a particular radiation detector is computed as a difference between an output value provided by the particular radiation detector when said reference lens is positioned within the optical path and a reference value which is based on output values provided by each of said plurality of radiation detectors when said reference lens is positioned within the optical path.

17. An imaging device according to claim 16, wherein the reference value is computed as one of a mean, median and mode of output values provided by said plurality of radiation detectors when said reference lens is positioned within the optical path.

18. An imaging device according to claim 16, wherein said processor is configured to compute a corrected output value for each of said plurality of radiation detectors when said reference lens is positioned without the optical path, wherein the corrected output value for a particular radiation detector is computed by subtracting an offset value previously computed for the particular radiation detector from an output value provided by the particular radiation detector when said reference lens is without the optical path.

19. An imaging device according to claim 9, wherein the first rough polished side of said reference lens blurs a scene image detected by said plurality of radiation detectors when said reference lens is positioned within the optical path.

20. An imaging device according to claim 1, wherein a thickness of said reference lens shifts a position of a focal plane in the optical path when said reference lens is positioned within the optical path.

21. An imaging device according to claim 20, wherein the thickness of said reference lens and a rough polished side of said reference lens are effective, in combination, to provide said plurality of radiation detectors with a uniform level of radiation when said reference lens is positioned within the optical path.

22. An imaging device according to claim 20, wherein the thickness of said reference lens is at least 0.03 inches.

23. An imaging device according to claim 1, wherein said lens carrier is configured as a wheel including an aperture into which said reference lens is inserted.

24. An imaging device according to claim 23, wherein said wheel is configured to rotate and to thereby alternately position said reference lens within and without the optical path.

25. An imaging device according to claim 1, further comprising a second plano-plano reference lens, wherein said lens carrier is configured to selectively position each of said first and second reference lenses within and without the optical path.

26. An imaging device according to claim 25, wherein said first reference lens provides said plurality of radiation detectors with a first uniform level of radiation when said first reference lens is positioned within the optical path, and wherein said second reference lens provides said plurality of radiation detectors with a second uniform level of radiation when said second reference lens is positioned within the optical path, a value of each of the first and second uniform levels of radiation being within an instantaneous dynamic flux range of said plurality of radiation detectors.

27. An imaging device according to claim 26, wherein the value of the first uniform level of radiation provided by said first reference lens corresponds to an upper end of the instantaneous dynamic flux range of said plurality of radiation detectors, and wherein the value of the second uniform level of radiation provided by said second reference lens corresponds to a lower end of the instantaneous dynamic flux range of said plurality of radiation detectors.

28. An imaging device according to claim 26, further comprising a processor configured to compute a scale factor and an offset value for each of said plurality of radiation detectors, wherein the scale factor and the offset value for a particular radiation detector are computed based on first and second output values provided by the particular radiation detector when said first and second reference lenses are positioned within the optical path, respectively, and on first and second reference values which are based on output values provided by each of said plurality of radiation detectors when said first and second reference lenses are positioned within the optical path, respectively.

29. An imaging device according to claim 28, wherein the first and second reference values are computed as one of a mean, median and mode of output values provided by said plurality of radiation detectors when said first and second reference lenses are positioned within the optical path, respectively.

30. An imaging device according to claim 28, wherein said processor is configured to compute a corrected output value for each of said plurality of radiation detectors when neither of said first and second reference lenses is positioned within the optical path, wherein the corrected output value for a particular radiation detector is computed based on a scale factor and an offset value previously computed for the particular radiation detector and on an output value provided by the particular radiation detector when neither of said first and second reference lenses is positioned within the optical path.

31. An imaging device according to claim 25, wherein said lens carrier is configured as a wheel including first and second apertures into which said first and second reference lenses are inserted, respectively.

32. An imaging device according to claim 31, wherein said wheel is configured to rotate and to thereby alternately position said first and second reference lenses within and without the optical path.

33. An imaging device according to claim 1, wherein a waveband used by said plurality of radiation detectors for imaging is an infrared waveband.

34. An imaging device according to claim 1, further comprising a plurality of plano-plano reference lenses, wherein said lens carrier is configured to selectively position each of said plurality of reference lenses within and without the optical path, and wherein each of said plurality of reference lenses provides said plurality of radiation detectors with a uniform level of radiation when positioned within the optical path, a value of the uniform level of radiation provided by each reference lens being within an instantaneous dynamic flux range of said plurality of radiation detectors.

35. An imaging device according to claim 34, further comprising a processor for computing piece-wise linear correction factors for each of said plurality of radiation detectors, wherein the piece-wise linear correction factors are computed based on output values provided by said plurality of radiation detectors as said reference lenses are successively positioned within the optical path.

36. An imaging device, comprising:
optics configured to focus scene radiation received at an input of said imaging device at a focal plane in an optical path of said imaging device;
a plurality of radiation detectors positioned in the focal plane;
a plano-plano reference lens having first and second sides, said first side being rough polished and coated with a non-reflective material and said second side being smooth polished and coated with a partially reflective material; and
a lens carrier supporting said reference lens and configured to selectively position said reference lens within and without the optical path,
wherein said reference lens is configured to provide said plurality of radiation detectors with a uniform level of radiation when said reference lens is positioned within the optical path, the uniform level of radiation having a value within an instantaneous dynamic flux range of said plurality of radiation detectors.

37. An imaging device according to claim 36, wherein said radiation detectors are uncooled thermal detectors.

38. An imaging device according to claim 36, wherein said radiation detectors are cryogenically cooled photoconductors.

39. An imaging device according to claim 36, wherein said radiation detectors are cryogenically cooled photovoltaic devices.

40. An imaging device according to claim 36, wherein said plurality of radiation detectors are positioned at the focal plane and form a staring-type two-dimensional focal plane array.

41. An imaging device according to claim 36, wherein said plurality of radiation detectors are positioned in the focal plane and form a scanning-type linear focal plane array.

42. An imaging device according to claim 36 wherein, when said reference lens is positioned within the optical path, said reference lens is situated between said optics and said plurality of radiation detectors such that said first and second sides of said reference lens are facing, respectively, away from and toward said plurality of radiation detectors.

43. An imaging device according to claim 36, wherein the first rough polished side of said reference lens blurs a scene image detected by said plurality of radiation detectors and a thickness of said reference lens shifts a position of the focal plane when said reference lens is positioned within the optical path.

44. An imaging device according to claim 36, wherein the partially reflective material coating the second smooth polished side of said reference lens reduces a level of scene radiation received by said plurality of radiation detectors and reflects radiation emitted by said plurality of radiation detectors back toward said plurality of radiation detectors when said reference lens is positioned within the optical path.

45. An imaging device according to claim 36, further comprising a processor configured to compute an offset value for each of said plurality of radiation detectors, wherein the offset value for a particular radiation detector is computed based on an output value provided by the particular radiation detector when said reference lens is positioned within the optical path and on a reference value which is based on output values provided by each of said plurality of radiation detectors when said reference lens is positioned within the optical path.

46. An imaging device according to claim 45, wherein said processor is configured to compute a corrected output value for each of said plurality of radiation detectors when said reference lens is positioned without the optical path, wherein the corrected output value for a particular radiation detector is computed based on an offset value previously computed for the particular radiation detector and on an output value provided by the particular radiation detector when said reference lens is without the optical path.

47. An imaging device according to claim 36, wherein said lens carrier is configured as a wheel including an aperture into which said reference lens is inserted.

48. An imaging device according to claim 47, wherein said wheel is configured to rotate and to thereby alternately position said reference lens within and without the optical path.

49. An imaging device according to claim 36, further comprising a second plano-plano reference lens, wherein said lens carrier is configured to selectively position each of said first and second reference lenses within and without the optical path.

50. An imaging device according to claim 49, wherein said first and second reference lenses provide said plurality of radiation detectors with first and second uniform levels of radiation when said first and second reference lenses are positioned within the optical path, respectively, a value of each of the first and second uniform levels of radiation lying within an instantaneous dynamic flux range of said plurality of radiation detectors.

51. An imaging device according to claim 49, further comprising a processor configured to compute a scale factor and an offset value for each of said plurality of radiation detectors, wherein the scale factor and the offset value for a particular radiation detector are computed based on first and second output values provided by the particular radiation detector when said first and second reference lenses are positioned within the optical path, respectively, and on first and second reference values, wherein the first and second reference values are based on output values provided by each of said plurality of radiation detectors when said first and second reference lenses are positioned within the optical path, respectively.

52. An imaging device according to claim 51, wherein said processor is configured to compute a corrected output value for each of said plurality of radiation detectors when neither of said first and second reference lenses is positioned within the optical path, wherein the corrected output value for a particular radiation detector is computed based on a scale factor and an offset value previously computed for the particular radiation detector and on an output value provided by the particular radiation detector when neither of said first and second reference lenses is positioned within the optical path.

53. An imaging device according to claim 49, wherein said lens carrier is configured as a wheel including first and second apertures into which said first and second reference lenses are inserted, respectively.

54. An imaging device according to claim 53, wherein said wheel is configured to rotate and to thereby alternately position said first and second reference lenses within and without the optical path.

55. An imaging device according to claim 36, wherein a waveband used by said plurality of radiation detectors for imaging is an infrared waveband.

56. An imaging device according to claim 36, further comprising a plurality of plano-plano reference lenses, wherein said lens carrier is configured to selectively position each of said plurality of reference lenses within and without the optical path, and wherein each of said plurality of reference lenses provides said plurality of radiation detectors with a uniform level of radiation when positioned within the optical path, a value of the uniform level of radiation provided by each reference lens being within an instantaneous dynamic flux range of said plurality of radiation detectors.

57. An imaging device according to claim 56, further comprising a processor for computing piece-wise linear correction factors for each of said plurality of radiation detectors, wherein the piece-wise linear correction factors are computed based on output values provided by said plurality of radiation detectors as said reference lenses are successively positioned within the optical path.

58. A method for correcting non-uniformities among a plurality of radiation detectors in an imaging device, said plurality of radiation detectors being positioned in a focal plane of an optical path of said imaging device, comprising the steps of:

positioning a piano-plano reference lens within the optical path to provide the plurality of radiation detectors with a uniform level of radiation;

computing an offset value for each of the plurality of radiation detectors based on values output by the plurality of radiation detectors when the reference lens is positioned within the optical path;

removing the reference lens from the optical path; and computing a corrected output value for each of the plurality of radiation detectors based on the computed offset values and on values output by the plurality of radiation detectors when the reference lens is removed from the optical path.

59. A method according to claim 58, wherein said step of computing an offset value for each of the plurality of radiation detectors comprises the step of:

computing one of a mean, median and mode output value provided by the plurality of radiation detectors when the reference lens is positioned with the optical path.

60. A method according to claim 58, further comprising the steps of:

positioning a second plano-plano reference lens within the optical path to provide the plurality of radiation detectors with a second uniform level of radiation;

computing a scale factor and an offset value for each of the plurality of radiation detectors based on values output by the plurality of radiation detectors when the first and second reference lenses are positioned within the optical path; and computing a corrected output value for each of the plurality of radiation detectors based on the computed scale factors and offset values and on values output by the plurality of radiation detectors when neither of the reference lenses is positioned within the optical path.

61. A method according to claim 58, further comprising the steps of:

successively positioning each one of a plurality of additional plano-plano reference lenses within the optical path;

computing piece-wise linear scale factors and offset values for each of the plurality of radiation detectors based on values output by the plurality of radiation detectors when the first and additional reference lenses are positioned within the optical path; and computing piece-wise linear corrected output values for each of the plurality of radiation detectors based on the computed piece-wise linear scale factors and offset values and on values output by the plurality of radiation detectors when none of the reference lenses is positioned within the optical path.

62. A method according to claim 58, wherein one side of the reference lens is rough polished and blurs an image detected by the plurality of radiation detectors when the reference lens is positioned within the optical path.

63. A method according to claim 58, wherein one side of the reference lens is coated with a partially reflective material and reduces a level of scene radiation received by the plurality of radiation detectors when the reference lens is positioned within the optical path.

64. A method according to claim 63, wherein the partially reflective material reflects radiation emitted by the plurality of radiation detectors back toward the plurality of radiation detectors.

65. A method according to claim 58, wherein a waveband used by the plurality of radiation detectors for imaging is an infrared waveband.

* * * * *